United States Patent [19]
Okumura et al.

[11] Patent Number: 4,759,055
[45] Date of Patent: Jul. 19, 1988

[54] KEY TELEPHONE SYSTEM

[75] Inventors: Senji Okumura; Katsuyuki Sekine; Ryuzo Sugiura, all of Tokyo, Japan

[73] Assignee: Tamura Electric Works, Ltd., Tokyo, Japan

[21] Appl. No.: 887,890

[22] Filed: Jul. 18, 1986

[30] Foreign Application Priority Data

Jul. 25, 1985 [JP] Japan .................................. 60-162830
Jul. 25, 1985 [JP] Japan .................................. 60-162831

[51] Int. Cl.⁴ ............................................. H04M 3/58
[52] U.S. Cl. .................................... 379/157; 379/212;
379/209; 379/165; 379/208
[58] Field of Search ................ 379/157, 164, 165, 208,
379/209, 210, 215, 381, 212

[56] References Cited

U.S. PATENT DOCUMENTS

| | | | |
|---|---|---|---|
| 3,553,385 | 1/1971 | Morgan et al. | 379/209 X |
| 3,707,605 | 12/1972 | Lee, Jr. et al. | 379/209 |
| 3,800,098 | 3/1974 | Evans et al. | 379/157 |
| 3,854,014 | 12/1974 | Akin et al. | 379/209 |
| 3,859,473 | 1/1975 | Brown et al. | 379/209 X |
| 3,934,098 | 1/1976 | Merritt, Jr. | 379/157 |
| 3,944,750 | 3/1976 | Sobonski | 379/208 X |
| 4,009,337 | 2/1977 | Sakai et al. | 379/209 X |
| 4,278,844 | 7/1981 | Jones | 379/157 |
| 4,383,137 | 5/1983 | Aikawa et al. | 379/165 |

FOREIGN PATENT DOCUMENTS 56-13051 10/1981 Japan .
57-3464  1/1982 Japan .................. 379/208

Primary Examiner—Keith E. George
Attorney, Agent, or Firm—Blakely, Sokoloff, Taylor and Zafman

[57] ABSTRACT

A key telephone system includes a plurality of key telephone sets having speakers and tone signal generators and communicating with each other through extension links. The key telephone system further includes a first memory, a second memory, a main CPU, a sub CPU, an MF signal generator, and a speech path switch. The first memory stores availability of the extension links. The main CPU discriminates whether all extension links are available according to the storage contents of the first memory in an extension call mode. The MF signal generator signals to a calling key telephone set that all the extension links are busy when the main CPU discriminates that all the extension links are busy. A second memory stores information on each calling and called key telephone set if the extension call is in a state where the MF signal generator signals that all the extension links are busy. The main and sub CPUs cooperate to perform call control of the called key telephone set using the tone signal generator and the speaker in the called key telephone set according to information stored in the first and second memories.

1 Claim, 14 Drawing Sheets

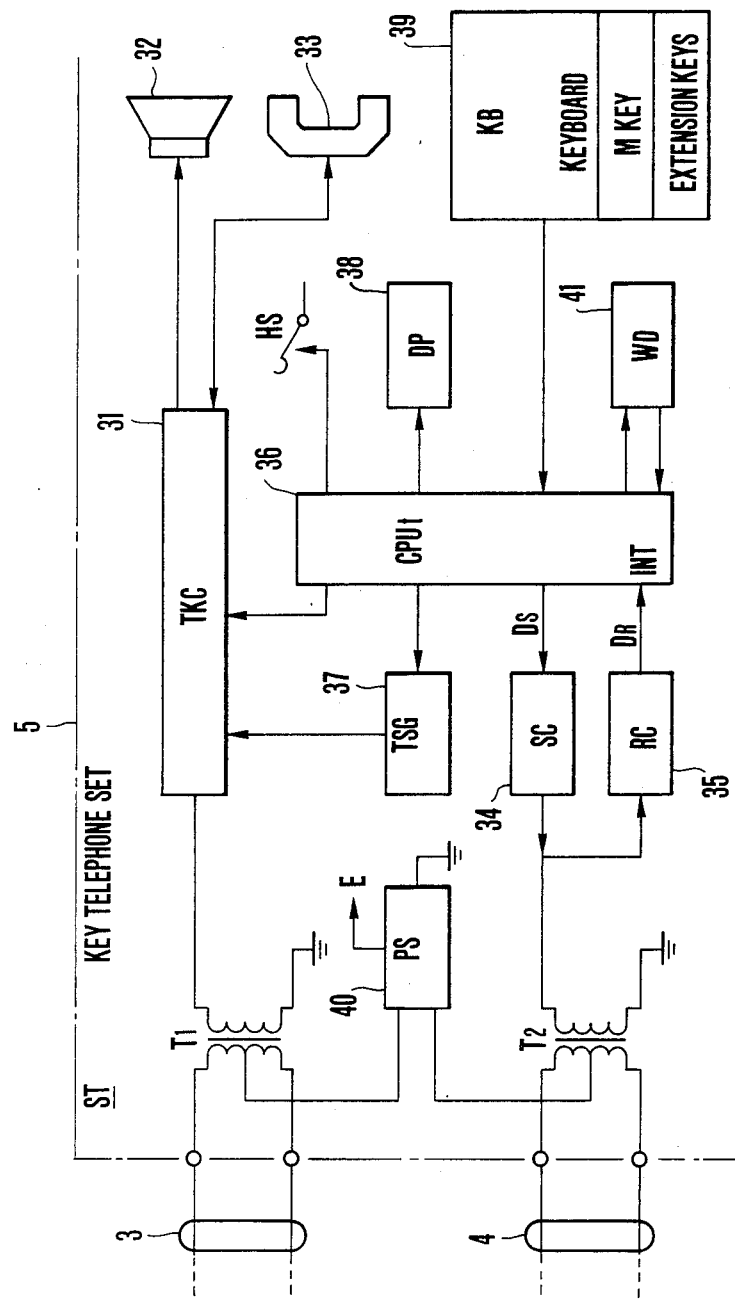

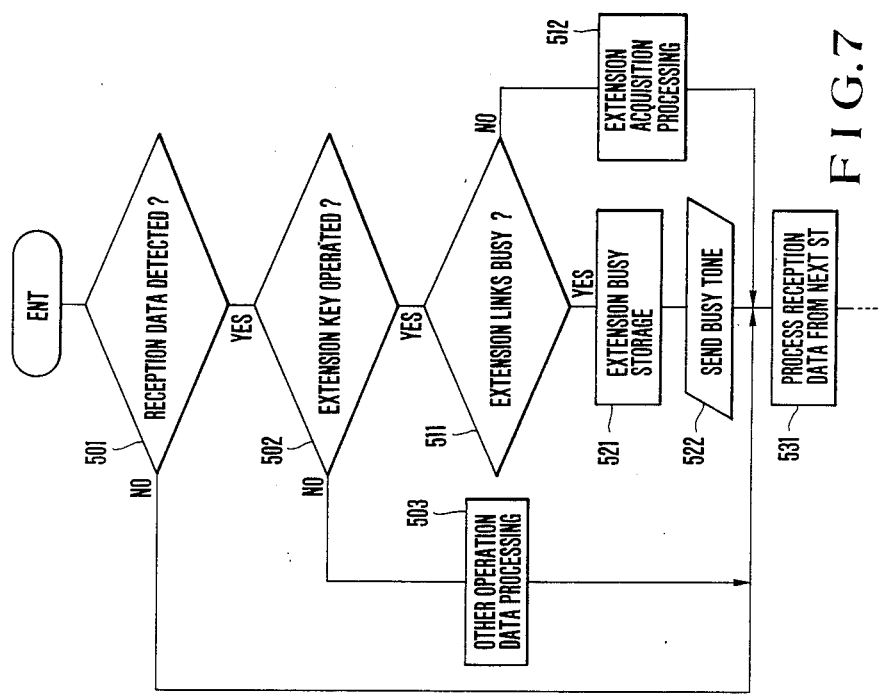
FIG. 7
FIG. 6
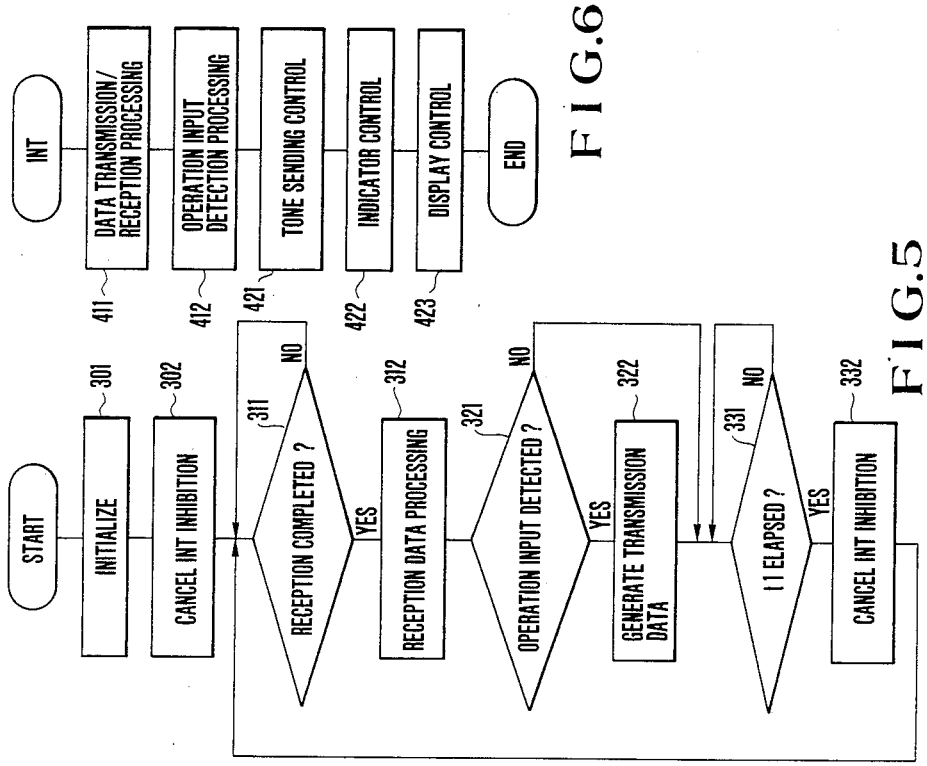
FIG. 5

KEY TELEPHONE SYSTEM

BACKGROUND OF THE INVENTION

The present invention relates to a key telephone system which switches key telephone sets accommodated as line and extension telephone sets in a main unit (KSU).

Extension links are arranged in a conventional key telephone system to form speech paths between the extensions, thereby interconnecting the key telephone sets. However, a given key telephone set cannot be called if the line is busy. In order to solve this problem, an extension call back or extension camp on function is provided in a conventional key telephone system.

Such a function can be registered for a call if an idle extension link is present. The extension call back is performed in the following manner. After a call back is registered, an extension calling party waits in the on-hook state. When the called party hangs up the telephone, the extension calling party is called. In this case, when the extension calling party answers the phone, the called party is automatically called. The extension camp on is performed as follows. When an extension calling party waits in the off-hook state, the extension camp on is registered, and the called party is automatically called upon on-hook.

However, in a conventional key telephone system, any call is invalid and the call back or the camp on cannot be registered if an idle extension link is not present. Thus, a desired party can be called only after an idle extension link is available, resulting in inconvenience.

SUMMARY OF THE INVENTION

It is, therefore, a principal object of the present invention to provide a key telephone system wherein an extension wait state is obtained even if all extension links are busy, and calling and called parties are called when an idle extension link becomes available.

It is another object of the present invention to provide a key telephone system, in addition to the above object, wherein a call can be made by an interrupt operation even if the line is busy.

It is still another object of the present invention to provide a key telephone system wherein transfer is indicated at a transfer destination key telephone set even if all extension links are busy.

In order to achieve the above objects of the present invention, there is provided a key telephone system including a plurality of key telephone sets incorporating speakers and tone generating devices for generating tones at the speakers through data lines under the control of a main unit, the plurality of key telephone sets being adapted to communicate with each other through extension links, comprising: a first memory for storing availability of the extension links; discriminating means for discriminating whether all extension links are available according to storage contents of the first memory in an extension call mode; alarming means for signalling to a calling key telephone set that all of the extension links are busy when the discriminating means discriminates that all of the extension links are busy; a second memory for storing extension wait state setting information on each of the calling key telephone set and a called key telephone set accessed by the extension call of the calling key telephone set in a state where the alarming means signals that all of the extension links are busy; and control means for performing call control of the called key telephone set using the tone generating device and the speaker in the called key telephone set according to information stored in the first and second memories. "Availability" here indicates busy or idle states of the extension links.

BRIEF DESCRIPTION OF THE DRAWINGS

FIG. 2 is a block diagram of a key telephone set (ST);

FIGS. 5 and 6 are respectively flow charts showing the control sequence of a CPU in the ST;

FIGS. 7 to 12 are respectively show charts showing the detailed operations in FIG. 3;

DESCRIPTION OF THE PREFERRED EMBODIMENT

The present invention will be described in detail with reference to a preferred embodiment in conjunction with the accompanying drawings.

Figure 1:
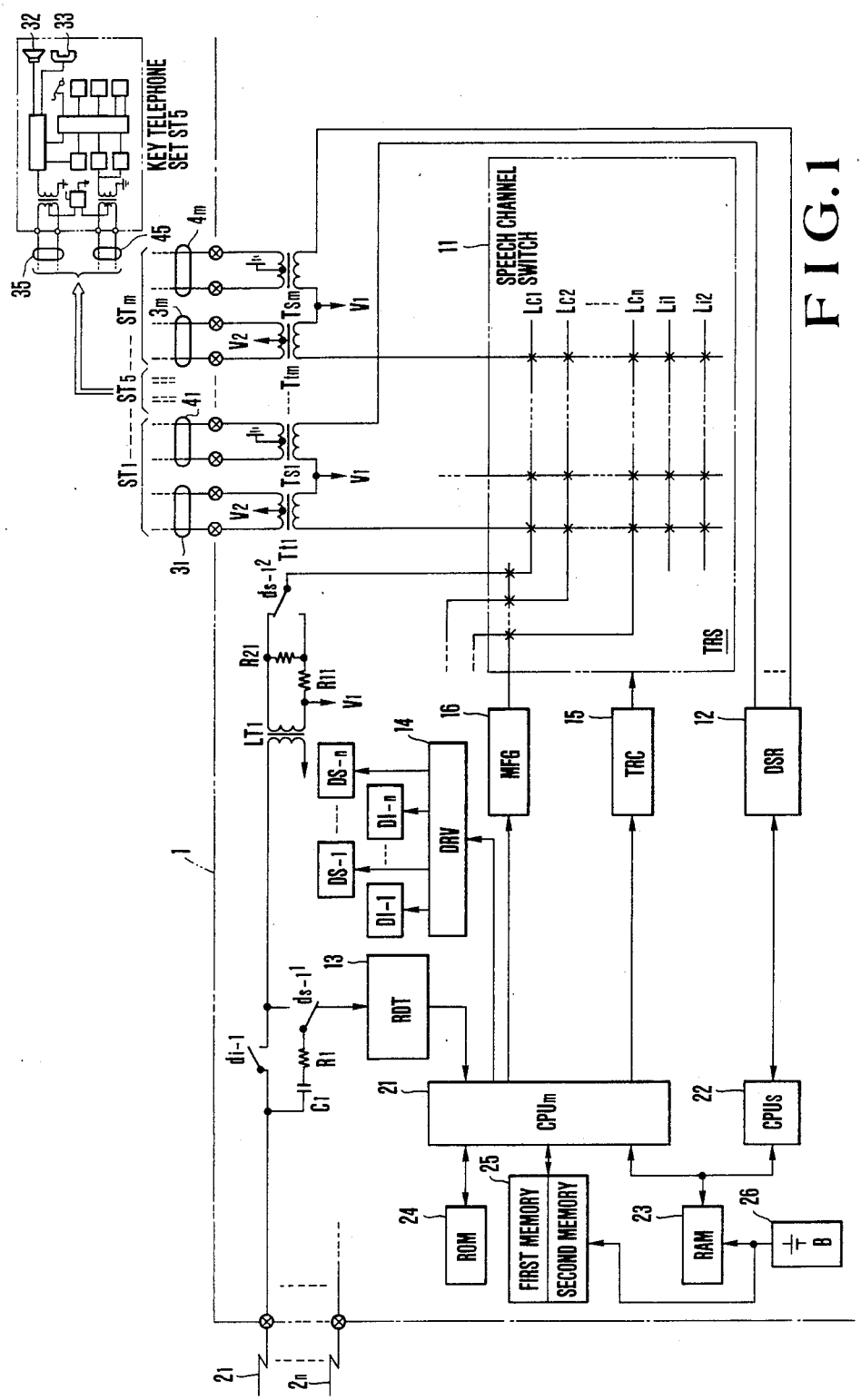
FIG. 1 is a block diagram of a main unit (KSU) in a key telephone system according to an embodiment of the present invention.

FIG. 1 shows a main unit (to be referred to as a KSU hereinafter) 1. Lines $2_1$ to $2_n$ such as main wires or telephone lines from a PBX (Private Branch Exchange) are accommodated in the KSU 1. As is represented by the line $2_1$, it is connected to a line link $L_{c1}$ in a speech channel switch (to be referred to as a TRS) 11 through relay contacts di-1 and ds-$1^1$, a line transformer $LT_1$, and a relay contact ds-$1^2$. The TRS 11 is constituted by cross points of analog switches or the like. Line links $L_{c1}$ to $L_{cn}$ and extension links $L_{i1}$ and $L_{i2}$ are connected to key telephone sets $ST_1$ to $ST_m$ through the cross points and transformers $T_{t1}$ to $T_{tm}$ via speech line pairs $3_1$ to $3_m$, respectively. The key telephone sets $ST_1$ to $ST_m$ are connected to a data sender/receiver (to be referred to as a DSR hereinafter) 12 through transformers $T_{s1}$ to $T_{sm}$ via signal line pairs $4_1$ to $4_m$.

A ringing detector (to be referred to as a RDT hereinafter) 13 is connected to each of the lines $2_1$ to $2_n$ through a capacitor $C_1$, a resistor $R_1$, and the contact ds-$1^1$ to detect an incoming ringing signal. A driver (to be referred to as a DRV) 14 is arranged to independently drive relays DI-1 to DI-n and DS-1 to DS-n respectively corresponding to the lines $2_1$ to $2_n$. Each relay (e.g, DI-1) has a contact (di-1), and another each relay (e.g., DS-1) has contacts (ds-$1^1$ and ds-$1^2$). A speech channel switch controller (to be referred to as a TRC hereinafter) 15 is connected to the TRS 11 to control the respective cross points in the links $L_{c1}$ to $L_{cn}$ and the links $L_{i1}$ and $L_{i2}$, thereby performing switching.

An MF signal generator (to be referred to as an MFG hereinafter) 16 is arranged for the lines. The MFG 16 uses a dual tone multifrequency (to be referred to as an DTMF) signal as a dial signal. An output from the MFG 16 is sent out to the corresponding lines through the corresponding cross point in the TRS 11 under the control of the TRC 15.

The KSU 1 also comprises a main processor (to be referred to as a CPUm hereinafter) 21 and a subprocessor (to be referred to as a CPUs hereinafter) 22, both of which control the respective components in the KSU 1. More specifically, the CPUs 22 controls the DSR 12 to exchange data with each key telephone set ST and stores the received data in the CPUm 21 and a common dynamic memory (to be referred to as a RAM hereinafter) 23. ST control data stored by the CPUm 21 in the RAM 23 is read out and sent to each key telephone set ST.

Each of the CPUm $2_1$ and the CPUs 22 comprises internal memories identical with the RAM 23 and a static memory (to be referred to as a ROM hereinafter) 24. The CPUm 21 and the CPUs 22 perform data processing by executing the programs stored in the internal memories according to the stored program scheme. In practice, necessary data in the internal memories and the RAM 25 is accessed.

The ROM 24 stores programs and data which exclude the ones stored in the internal memories in the CPUm 21. The programs and data stored in the ROM 24 define the operation of the CPUm 21. Data representing various conditions is registered and stored in the RAM 25 serving as first and second memories.

According to a detection output from the RDT 13 and operation data upon operation of each key telephone set ST, the CPUm 21 controls the DRV 14 and the MFG 16 and also controls the TRS 11 through the TRC 15, thereby performing switching. The CPUm 21 sequentially and repeatedly sends control data to each key telephone set ST through the CPUs 22 and the DRS 12 to control ST indicators ST display devices, and ST alarm tones as well as call processing.

Driving of the relays DI-1 to DI-n through the DRV 14 closes a DC loop for the lines $2_1$ to $2_n$ by means of the primary windings of the line transformers $LT_1$ to $LT_n$ to perform line acquisition or holding. A dial pulse is sent onto a pulse dial circuit after the line acquisition. At this time, the relays DS-1 to DS-n are simultaneously driven. The capacitors $C_1$ to $C_n$ and the resistors $R_1$ to $R_n$ are connected for spark extinction in parallel with the contacts di-$1^1$ to di-n$^1$ through the contacts ds-$1^1$ to ds-n$^1$. The line links $L_{c1}$ to $L_{cn}$ are connected through the contacts ds-$1^2$ to ds-n$^2$ to the side where high-resistance resistors $R_{11}$ to $R_{1n}$ and parallel resistors $R_{21}$ to $R_{2n}$ are inserted for the secondary windings of the line transformers $LT_1$ to $LT_n$. The click tones following the dial pulses can be prevented from being supplied as a high level click tone to each key telephone set ST.

A power source voltage $V_1$ of $+5$ V for analog switches in the TRS 11 is supplied to the secondary windings of the line transformers $LT_1$ to $LT_n$ and the primary windings of the transformers $T_{t1}$ to $T_{tm}$ and $T_{s1}$ to $T_{sm}$. At the same time, a power source voltage $V_2$ of, for example, $+27$ V is supplied to the central taps of the secondary windings of the transformers $T_{t1}$ to $T_{tm}$. The central taps of the secondary windings of the transformers $T_{s1}$ to $T_{sm}$ are connected to the power source feedback path, thereby supplying phantom power to each key telephone set ST.

The KSU 1 uses AC outlet power as a main power source. In case of a power failure, the KSU 1 is backed up by a battery 26 so as to prevent data loss of the RAMs 23 and 25.

FIG. 2 shows a block diagram of the key telephone set ST5. Transformers $T_1$ and $T_2$ are connected to the speech line pair 3 and the signal line pair 4. A loudspeaker 32 and a handset 33 are connected to a talking circuit (to be referred to as a TKC hereinafter) 31 comprising an amplifier through the transformer $T_1$. A sending circuit (to be referred to as an SC hereinafter) 34 and a receiving circuit (to be referred to as an RC hereinafter) 35 are connected to the transformer $T_2$. The SC 34 is controlled by a processor (to be referred to as a CPUt hereinafter) 36 substantially identical with the CPUs 22. A reception output from the RC 35 is supplied to the CPUt 36. The CPUt 36 controls the TKC 31, a tone signal generator (to be referred to as a TSG hereinafter) 37, and a display circuit (to be referred to as a DP hereinafter) 38 in response to the output from the RC 35 operated upon reception of the control data from the KSU 1. The DP 38 includes a plurality of indicators and a character display (to be referred to as a DGP hereinafter). The CPUt 36 also controls the SC 34 in response to the operation outputs from a keyboard (to be referred to as a KB hereinafter) 39 and a hook switch HS, thereby transmitting operation data.

A power source circuit (to be referred to as a PS hereinafter) 40 is connected to the line-side central taps of the transformers $T_1$ and $T_2$. The power supplied from the KSU through the pairs 3 and 4 is stabilized by the power source circuit 40, thereby providing a local power source E for the components requiring it.

A supervisory circuit (to be referred to as a WD hereinafter) 41 is arranged to detect overrun of the CPUt 36, and a voltage drop of the local power source E, and the rising edge thereof. Upon such detection, the CPUt 36 is reset and initialized.

The output from the RC 35 is supplied to an interrupt input INT of the CPUt 36. This input is valid only when the interrupt input of the CPUt 36 is enabled. Control data reception and operation data transmission are performed in response to a polling signal from the KSU 1.

If one of the key telephone sets ST is set in an off-hook state and a line key input is performed on the KB 39, the corresponding operation data is sent by the SC 34 and is stored by the CPUs 22 (FIG. 1) in RAM 23 (FIG. 1) through the DSR 12 (FIG. 1) in the KSU 1 (FIG. 1). The CPUm 21 controls the DRV 14 to set the contact di in the ON state to engage the lines with the key telephone set ST5. In order to connect the line link CL to the key telephone set ST5 by controlling the TRC 15, dial keys in the KB 38 are operated. The CPUm 21 is then operated in the same manner as described above. A dial pulse in the form of a pulse signal controls the DRV 14 according to the type of exchange connected to the lines $2_1$ to $2_n$ to set the contact ds in the ON state. The ON/OFF state of the contact di allows sending out of dial pulses. If the dial pulse is an MF signal, the TRC 15 and the MFG 16 are controlled to send out the dial signal in the form of the MF signal, thereby dialing the other end of the line. When the called party answers the phone, the calling party can speak through the handset 33 and the TKC 31.

If an incoming call is received from the lines $2_1$ to $2_n$, the CPUm 21 controls the DRV 14 in response to the detection output from the RDT 13 to set the contact di in the ON state, thereby forming a DC loop by the transformers $LT_1$ to $LT_n$. At the same time, in order to store control data in the RAM 23, the control data is sent from the CPUs 22 to each key telephone set ST through the DSR 12. Upon its reception by the CPUt 36 through the RC 35, the CPUt 36 controls the TKC 31, the TSG 37, and the DP 38. The line indicator in the DP 38 flickers and a line ringing tone is produced at the loudspeaker 32, thereby acknowledging the reception of an incoming line call.

If any key telephone set ST responds to the incoming call in the same manner as for an outgoing call, the CPUm 21 controls the TRC 15 according to the operation data. The corresponding cross point in the TRS 11 is enabled to allow the response.

When a holding key or an extension key in the KB 39 is operated during the call from the lines, the CPUm 21 controls the TRC 15 to disable the cross point, thereby disconnecting the key telephone set ST which is engaged with the lines. In this case, the DC loop for the lines is kept held. Therefore, the holding state is set.

Assume that an extension key is operated for transfer. In this case, if a two-digit extension number is dialed in the KB 39 in order to cause the CPUm 21 to connect the key telephone set ST which is engaged with the lines to an idle one of the extension links $L_{i1}$ and $L_{i2}$, the TSG 37 sends an extension ringing tone to drive the loudspeaker 32 and cause the extension indicator in the DP 38 to flicker. If the called party responds to this call, an extension call can be performed, thereby transferring the line call.

If extension key depression and extension number dialing are performed in the off-hook state, the same switching as described above is performed to allow a normal extension call.

Figure 3:
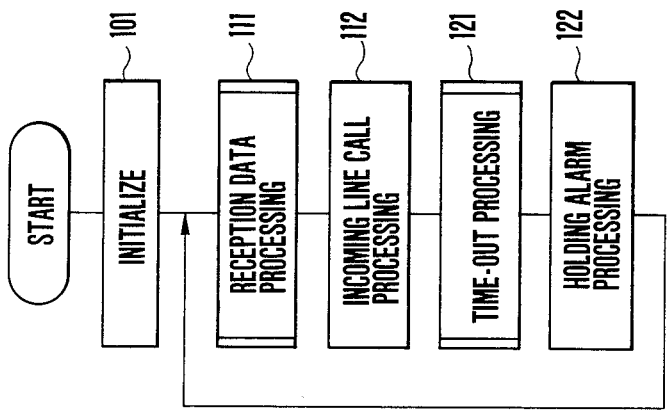

FIG. 3 shows normal processing of the CPUm 21 in the KSU 1. Initialization is performed in step 101. Data received from each key telephone set ST is processed in step 111. A line call reception from the lines $2_1$ to $2_n$ is performed in step 112. "Time-out" processing for the timers in the CPUm 21 is performed in step 121, and holding alarm processing is performed in step 122. The operations in step 111 and the subsequent steps are repeated.

Figure 4:
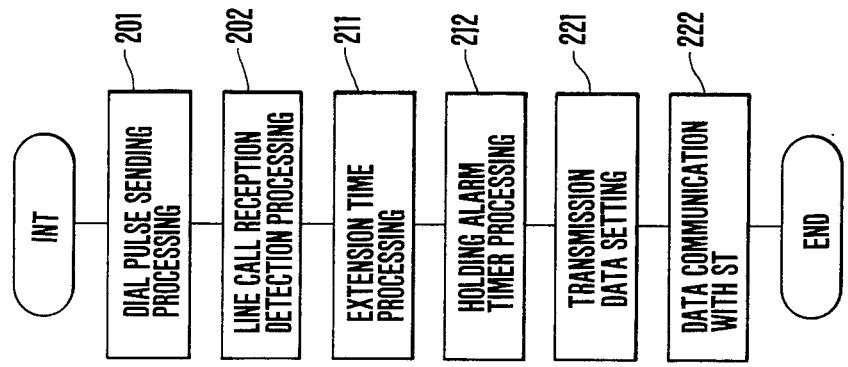
FIGS. 3 and 4 are respectively flow charts showing the control sequence of a main CPU in the KSU.

FIG. 4 shows interrupt processing of the CPUm 21. Interrupt processing is repeated for ever 5-msec cycle. Dial pulse sending processing is performed in step 201. Line call detection processing on the basis of the detection output from the RDT 13 is performed in step 202. Extension timer processing and holding alarm timer processing are respectively performed in steps 211 and 212. For each of the key telephone sets $ST_1$ to $ST_m$, sending data setting is performed in step 221 to store the control data in the RAM 23. An instruction is sent to the CPUs 22. Data transmission/reception with each of the key telephone sets $ST_1$ to $ST_m$ is performed in step 222.

FIG. 5 shows normal processing of the CPUt 35 in the key telephone set ST5. Initialization by the WD 41 is performed in step 301. An interrupt input in a reception data signal $D_R$ is subjected to INT inhibition cancel processing in step 302, thereby enabling the interrupt signal. If YES in step 311, i.e., if the interrupt reception data is determined in this step to have been completely received, reception data processing is performed in step 312. If YES in step 321, i.e., if an operation input is detected, transmission data formation for a transmission data signal $D_S$ is performed in step 322. If the timer in the CPUt 36 determines in step 331 that a period $t_1$, e.g., 80 msec, has elapsed, or if YES in this step, INT inhibition cancel processing is performed in step 332 again. The operations in step 311 and the subsequent steps are repeated.

FIG. 6 shows interrupt processing of the CPUt 36. Data reception/transmission with KSU 1 is processed in step 411 so that data is exchanged between the SC 34 and the RC 35. Operation detection processing is performed in step 412 to check outputs from the hook switch HS and the KB 39. Tone sending control according to the contents of the memory is performed in step 421, thereby sending out a tone signal. Indicator control is then performed in step 422 so that the indicators in the DP 38 are turned off, are turned on, or flicker. Display control is performed in step 423 to determine the display state of the DGP in the DP 38.

FIG. 7 shows a detailed operation of step 111. If the reception data is detected in step 501, or if YES in this step, the CPUm 21 determines in step 502 whether an extension key is operated. If NO in step 502, other operation data processing is performed in step 503. However, if YES in step 502, the CPUm 21 determines in step 511 whether all extension links are busy according to the status data in the RAM 25. If NO in step 511, extension acquisition processing is performed in step 512 to connect a calling key telephone set ST to an idle extension link. However, if YES in step 511, extension busy storage is performed in step 521 to register the calling key telephone set ST in the ROM 25. Busy tone sending is performed by the calling key telephone set ST in step 522. Processing for reception data from the next key telephone set ST is performed in step 531.

Figure 8:
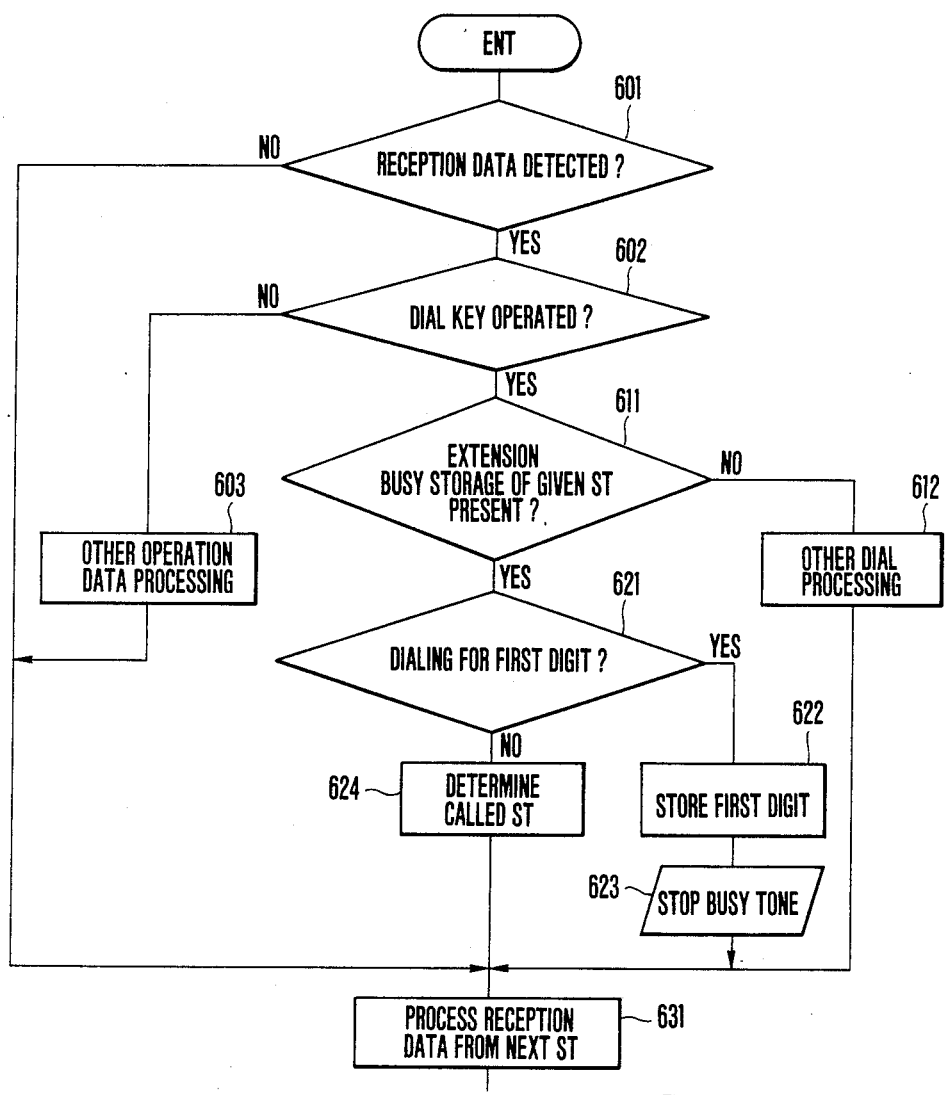

FIG. 8 is the same flow chart as in FIG. 7 when the calling key telephone set ST dials the called key telephone set ST after the operations in FIG. 7. If the CPUm 21 determines in step 601 that the reception data is detected, i.e., if YES in this step, the flow advances to step 602. The CPUm 21 determines in step 602 whether dial keys are operated. If NO in step 602, other operation data is processed in step 603. However, if YES in step 602, the CPUm 21 determines in step 611 whether the extension busy signal for the calling ST is present in correspondence with step 521. If NO in step 611, other dial processing is performed in step 612. However, if YES in step 611, the CPUm 21 determines in step 621 whether dialing is made for the first digit. If YES in step 621, this digit is stored in step 622 and the busy tone generated in step 522 is stopped in step 623. However, if dialing is made for the second digit, step 621 is determined to be NO. The called key telephone set ST is determined, and its number is stored in the RAM 25 in step 624. Processing for reception data from the next key telephone set ST is then performed in step 631.

Figure 9:
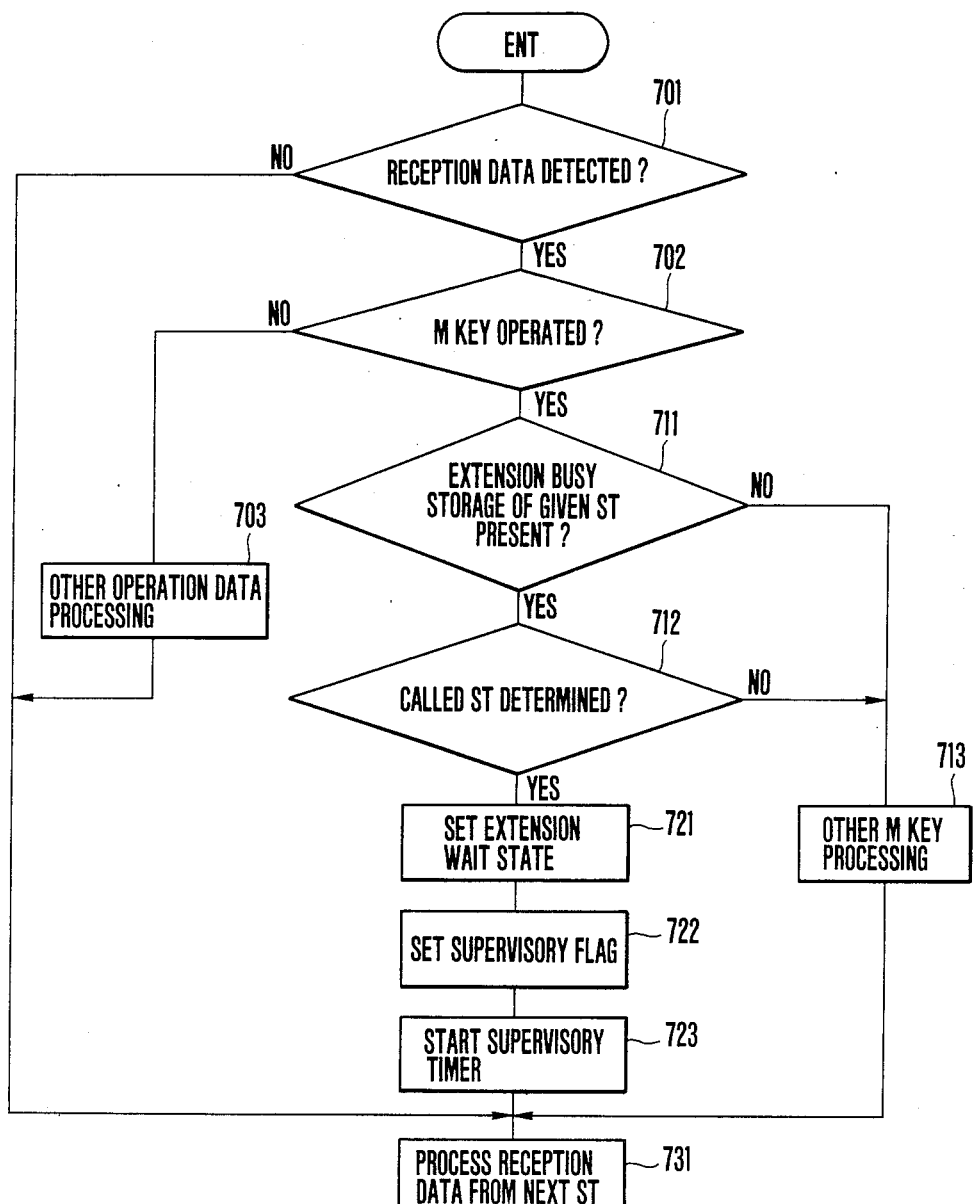

FIG. 9 shows the same flow chart as in FIG. 7 when the calling key telephone set performs registration after the operations in FIG. 8. The CPUm 21 determines in step 701 whether the reception data is present. If YES in step 701, the CPUm 21 determines in step 702 whether the M (memory) key for registering a dial number is operated. If NO in step 702, other operation data processing is performed in step 703. However, if YES in step 702, the CPUm 21 determines in step 711 whether the extension busy signal for the calling key telephone set ST is present in the same manner as in step 611. If YES in step 711, the CPUm 21 determines in step 712 whether the key telephone set determined in step 624 is the called key telephone set. If NO in either step 711 or 712, other M key processing is performed in step 713. However, if YES in step 712, extension wait state setting is performed in step 721 to store the calling and called key telephone set numbers in the RAM 25. The extension links are periodically monitored or supervised, a supervisory flag is set in step 722, and a supervisory timer in the CPUm 21 is started in step 723. Processing fo reception data from the next key telephone set is performed in step 731.

The extension calling operation allows setting of an extension wait state. A combination of the calling and called key telephone sets is registered and stored. In step 723, an idle extension link is periodically checked.

Figure 10:
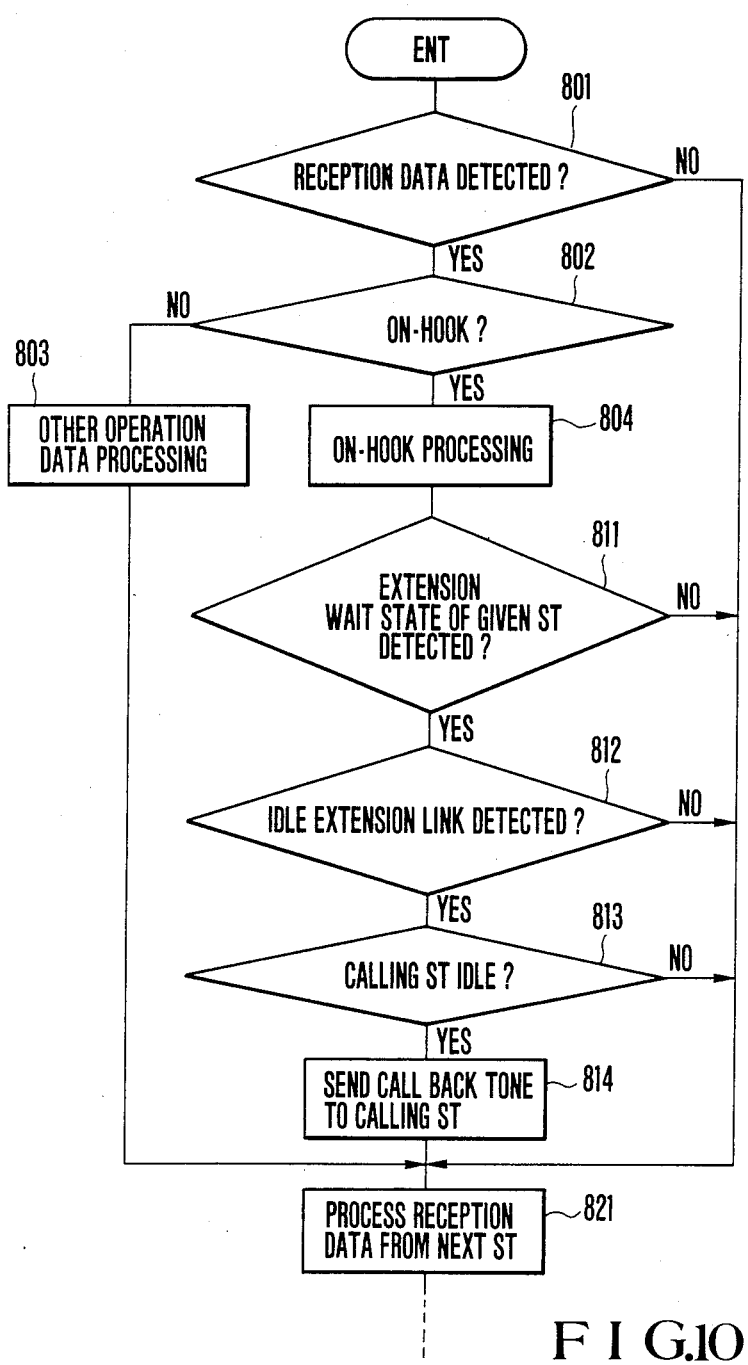

FIG. 10 shows the same flow chart as in FIG. 7 when one of the key telephone sets is held in the on-hook state after the operations in FIG. 9. The CPUm 21 determines in step 801 whether the reception data is present. If YES in step 801, the CPUm 21 determines in step 802 whether the on-hook state is detected. If NO in step 802, other operation data processing is performed in step 803. However, if YES in step 802, on-hook processing is performed in step 804, thereby cancelling the current switching connection. The CPUm 21 determines in step 811 whether the calling and called key telephone sets registered in step 721 are set in the extension wait state. If YES in step 811, the CPUm 21 checks in step 812 according to the status data in the RAM 25 whether an idle extension link is present. If YES in step 812, the CPUm 21 checks in step 813 whether the calling key telephone set is held in an idle state. If YES in step 813, a call back tone is sent from the TSG 37 to the calling key telephone set. This tone is produced at the loudspeaker 32. Processing for reception data from the next key telephone set is performed in step 821.

If an idle extension link is found, the call back tone is sent to the calling key telephone set. The calling set reponds to this tone, an extension call can be made.

However, if the idle extension link is not present, no call back tone is generated.

Figure 11:
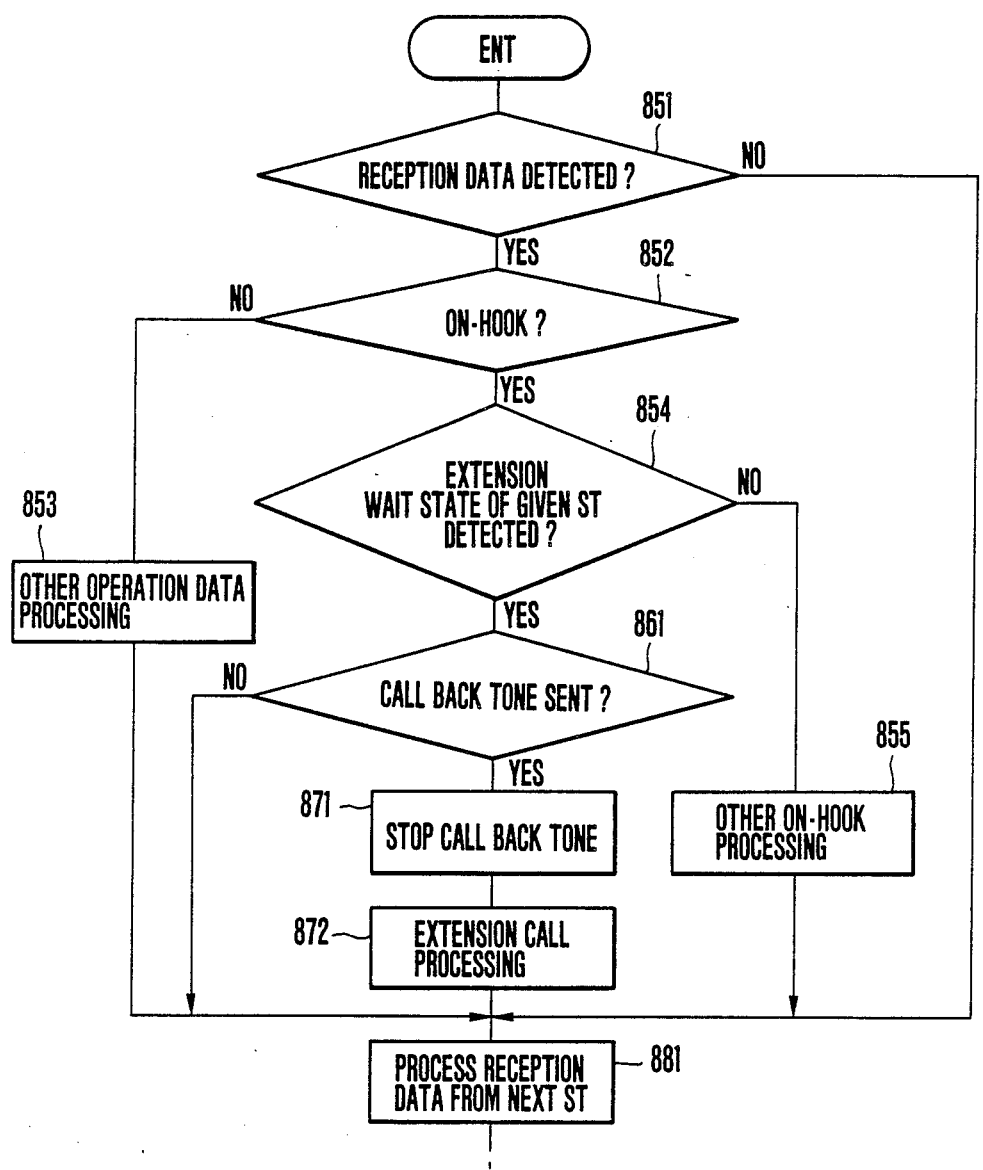

FIG. 11 is the same flow chart as in FIG. 7 when the conditions in FIG. 10 are satisfied and the calling key telephone set ST is set in the off-hook state in response to the call back tone. The CPUm 21 determines in step 851 whether reception data is present. If YES in step 851, the CPUm 21 determines in step 852 whether the calling key telephone set is set in the off-hook state. If NO in step 851, other operation data processing is performed in step 853. However, if YES in step 851, the CPUm 21 determines in step 854 whether the calling and called key telephone sets are held in the extension wait state, as in step 811. If NO in step 854, other on-hook processing is performed in step 855. However, if YES in step 854, the CPUm 21 checks in step 861 whether the call back tone generated in step 814 is sent to the calling key telephone set. If YES in step 861, the call back tone is stopped in step 871 and extension call processing is performed in step 872. The extension ringing tone is sent to the called key telephone set in step 872. Processing for reception data from the next key telephone set is performed in step 881.

If the called key telephone set responds to the ringing signal, an extension channel is looped, so that a call can be made between the calling and called key telephone sets.

Figure 12:
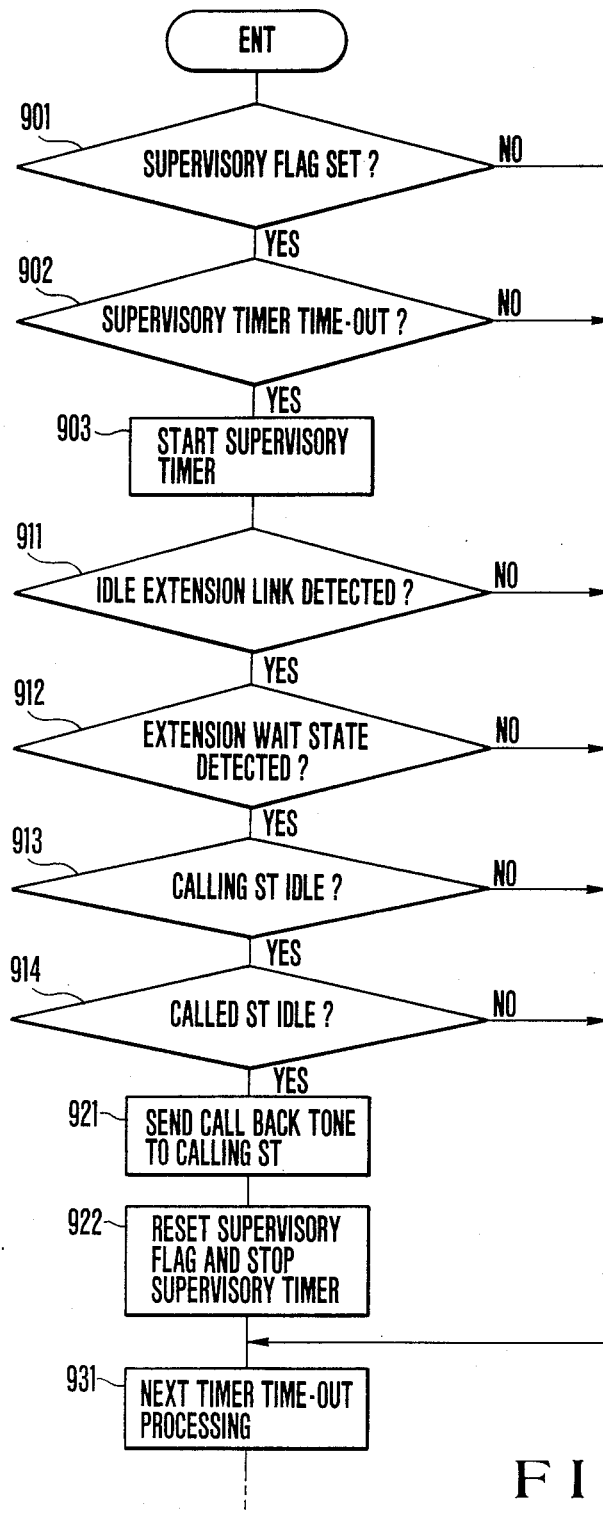

FIG. 12 shows the detailed operation in step 121. The CPUm 21 determines in step 901 whether the supervisory flag set in step 722 is still set. The CPUm 21 determines in step 902 whether the supervisory timer time set in step 723 has elapsed. If YES in steps 901 and 902, the supervisory timer is started again in step 903. The CPUm 21 determines in step 911 according to the status data in the RAM 25 whether an idle extension link is present. If YES in step 911, the same operation as in step 811 is performed in step 912. If YES in step 912, the CPUm 21 checks in step 913 whether the calling key telephone set is held in the idle state. The CPUm 21 also checks in step 914 whether the called key telephone set is held in the idle state. If YES in steps 912 and 914, the call back tone is sent to the calling key telephone set in step 921. The supervisory flag is reset and the supervisory timer is stopped in step 922. The next timer time-out processing is performed in step 931.

If the conditions in FIG. 10 are not satisfied, the extension links are periodically checked by the operations in FIGS. 9 and 12. Upon generation of an idle link, the call back tone is generated to the calling key telephone set. When the calling key telephone set is set in the off-hook state, an extension call can be made according to the control sequence in FIG. 11.

Even if all extension links are busy, the call to a key telephone set to be called is immediately accepted and registered. The calling key telephone set can wait in the on-hook state. Therefore, an extension call for the key telephone set which is engaged with lines can be simplified.

Even if the calling key telephone set is held in the off-hook state, the call back tone may be generated. In this case, the called key telephone set is immediately called.

If the calling key telephone set waits in the off-hook without operation of the M key, the extension camp on function may be used.

According to the present invention as described above, even if a called key telephone set is engaged with lines and all extension links are busy, the extension wait state can be set. Upon generation of an idle link, the calling and called key telephone sets are acknowledged of the presence of such an idle link. Therefore, an extension call can be made to a busy key telephone set. Various advantages can be provided in various types of key telephone systems.

The constitutions in FIGS. 1 and 2 may be arbitrarily modified. The steps in FIGS. 3 to 12 may be replaced with other or identical steps, or may be omitted arbitrarily.

Figure 13:
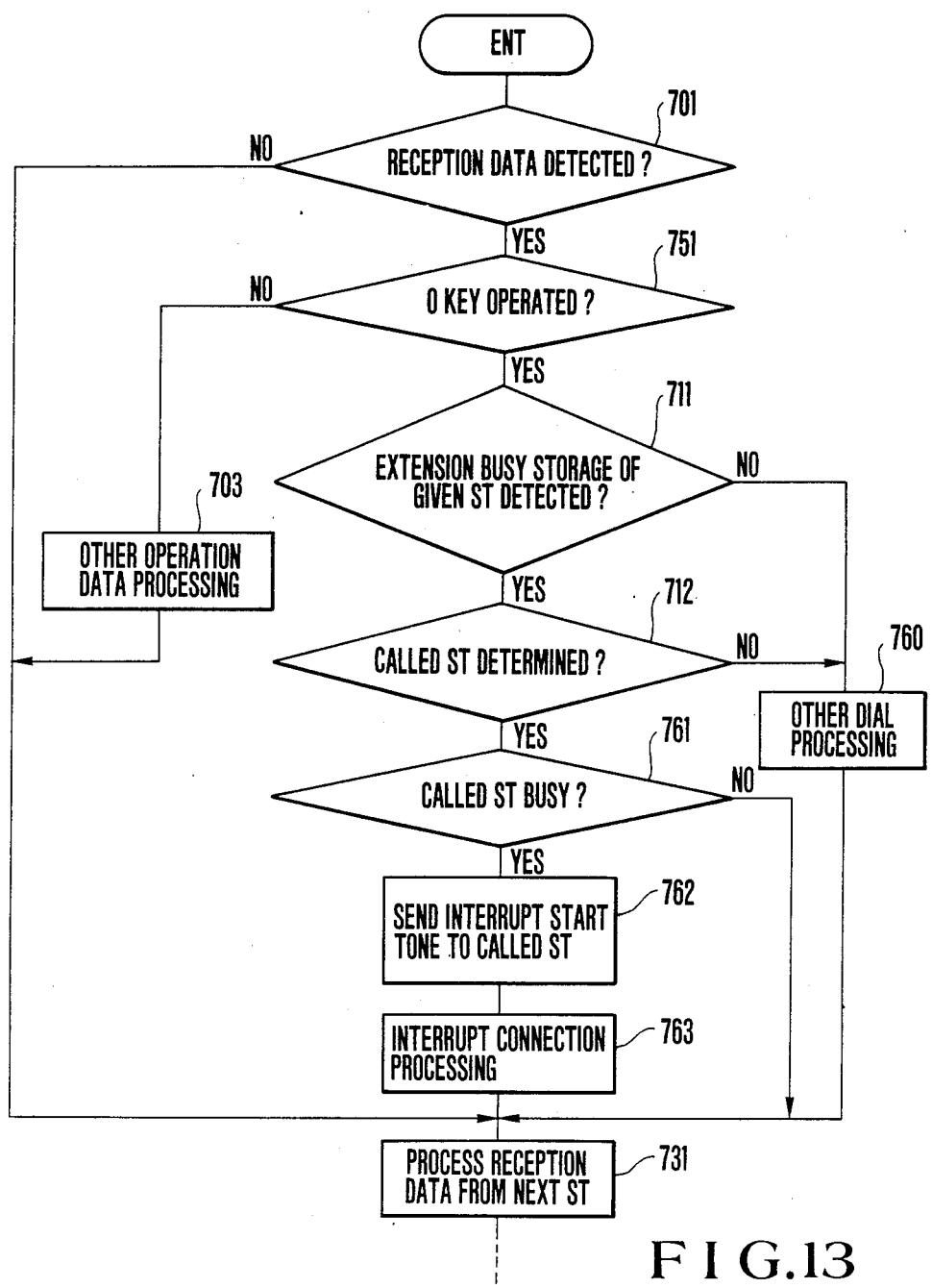
FIG. 13 is a flow chart showing a modification of FIG. 9.

FIG. 13 is a modification of FIG. 9. The routine in FIG. 13 is executed in the following manner. If all the extension links are determined to be busy according to the contents of the memory, the calling key telephone set is connected to the channel of the called key telephone set according to the extension call and interrupt operations of the calling telephone set under the condition that the called key telephone set is busy. Thus, an interrupt call can be made. This operation can be performed upon operation of the "0" key at the calling key telephone set. Referring to FIG. 13, the CPUm 21 determines in step 701 whether reception data is present. If YES in step 701, the CPUm 21 determines in step 751 whether the "0" key is operated. If NO in step 751, other operation data processing is performed in step 703. However, if YES in step 751, the same operation as in step 611 is performed in step 711. The CPUm 21 determines in step 712 whether the key telephone set determined in step 624 is the called key telephone set. If NO in either step 711 or 712, other dial processing is performed in step 760. However, if YES in both steps 711 and 712, the CPUm 21 determines in step 761 according to the status data from the RAM 25 whether the called key telephone set is busy. If YES in step 761, a sound signalling an interrupt operation is generated in step 762. Interrupt connection processing is performed in step 763. The called key telephone set forcibly connects the calling key telephone set to the in-use line link or an extension link. Processing for reception data from the next key telephone set is performed in step 731.

When the extension call and interruption operations are performed by the calling key telephone set, the calling key telephone set is connected to the speech channel of the called key telephone set if the called one is busy. Therefore, the three parties, i.e., the called party, the line calling party, and the extension calling party can communicate with each other for emergency.

In the above interrupt operation, a specific key may be used in place of the "0" key. While the called key telephone set is busy, the interrupt connection may be made after an off-hook state is held for a predetermined period of time.

As is apparent from the modification in FIG. 13, even if all the extension links are busy and the called key telephone set is busy, the calling key telephone set can be connected to the called one by interruption. A call can be immediately started, thereby achieving an emergency call. Practical advantages can be obtained in various types of key telephone sets.

FIGS. 14 to 17 show still other modifications of the present invention. If a line call is to be transferred, on-hook operation is performed at the source key telephone set after an extension call for a destination key telephone set is made. Then, tone signal and transfer indication are provided in the destination key telephone set if all extension links are busy.

Figure 14:
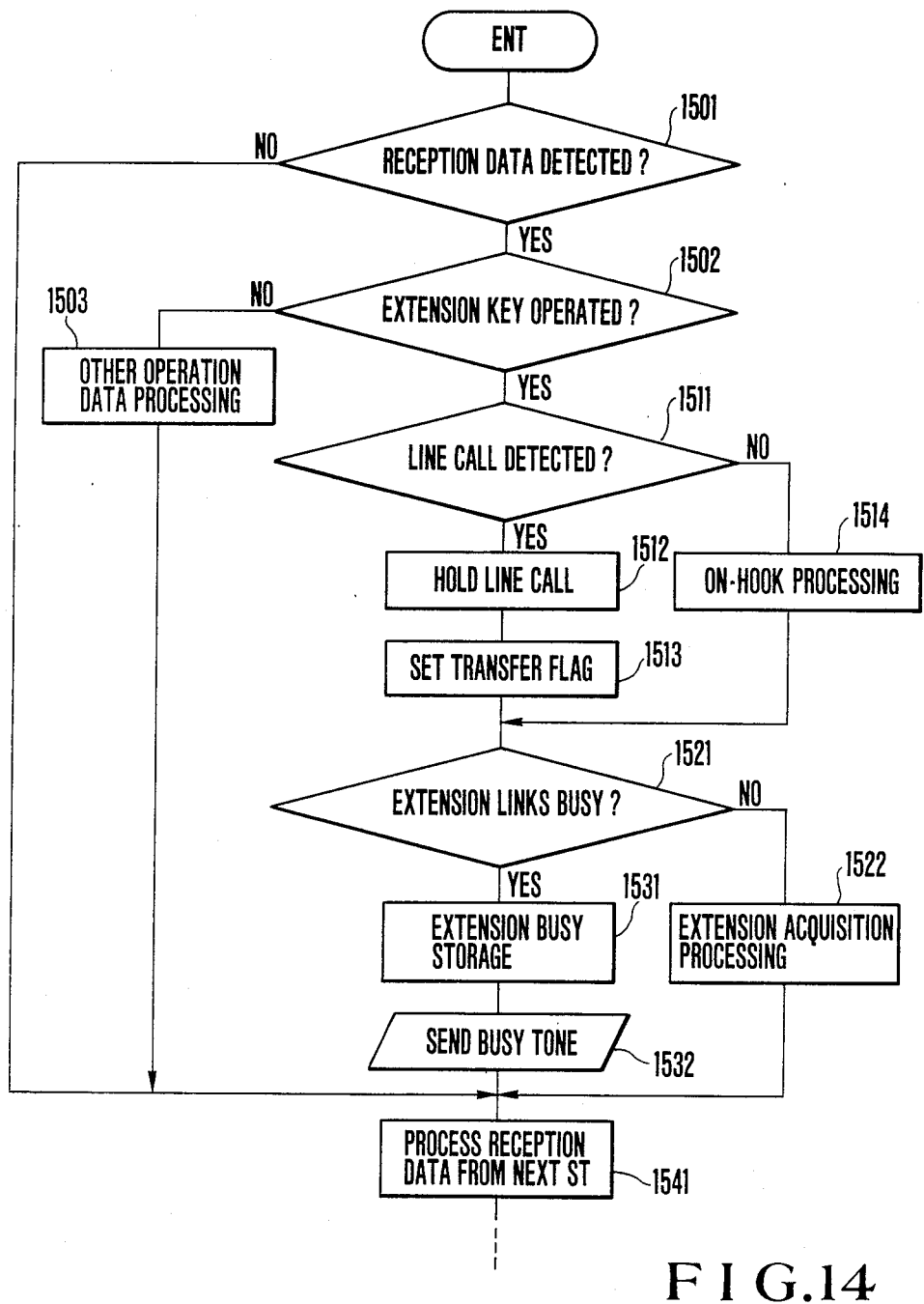
FIGS. 14 to 17 are respectively flow charts showing other modifications according to the present invention.

FIG. 14 shows a detailed operation of step 111 in FIG. 3. The operation is a modification in FIG. 7. Referring to FIG. 14, the CPUm 21 determines in step 1501 whether reception data is present. If YES in step 1501, the CPUm 21 determines in step 1502 whether an extension key is operated. If NO in step 1502, other operation data processing is performed in step 1503. However, if YES in step 1502, the CPUm 21 determines in step 1511 according to the status data from the RAM 25 whether a line call is being made. If YES in step Y, the called key telephone set is a source. Line wire holding is performed under the control of the DRV 14 in step 1512. The transfer flag is set in step 1513. However, if NO in step 1511, on-hook processing is performed in step 1514 to disengage the respective components from the lines.

The CPUm 21 determines in step 1521 in the same manner as in step 1511 according to the status data from the ROM 15 whether all extension links are busy. If NO in step 1521, extension acquisition processing is performed in step 1522 to connect the calling key telephone set to an idle extension link. If YES in step 1521, the extension busy state for the calling key telephone set is stored in the RAM 25. A busy tone is generated in the calling key telephone set in step 1532. Processing for reception data from the next key telephone set is performed in step 1541.

In this modification, if a called key telephone set number is entered at the calling key telephone set, the same operation as in FIG. 8 is performed. Referring to FIG. 8, if YES in step 601, the CPUm 21 determines in step 602 whether dial keys are operated. If NO in step 602, other operation data processing is performed in step 603. However, if YES in step 602, the CPUm 21 determines in step 611 whether the extension busy state registered in step 1531 in FIG. 14 is still held. If NO in step 611, other dial processing is performed in step 612. However, if YES in step 611, the CPUm 21 determines in step 621 whether the dialing operation is made for the first digit. If YES in step 621, the first digit is stored in step 622. The busy tone generated in step 1532 is stopped in step 623. However, if NO in step 621, i.e., if the dialing operation is determined to be made for the second digit, the called key telephone set is determined and its number is stored in the RAM 25 in step 624. Processing for reception data for the next key telephone set is performed in step 631.

The line holding is set by the above extension call. At the same time, if all the extension links $L_{i1}$ and $L_{i2}$ are determined to be busy according to the contents of the RAM 25, the transfer destination key telephone set is stored as the called key telephone set in the RAM 25 in step 624 in response to extension number dialing.

Figure 15:
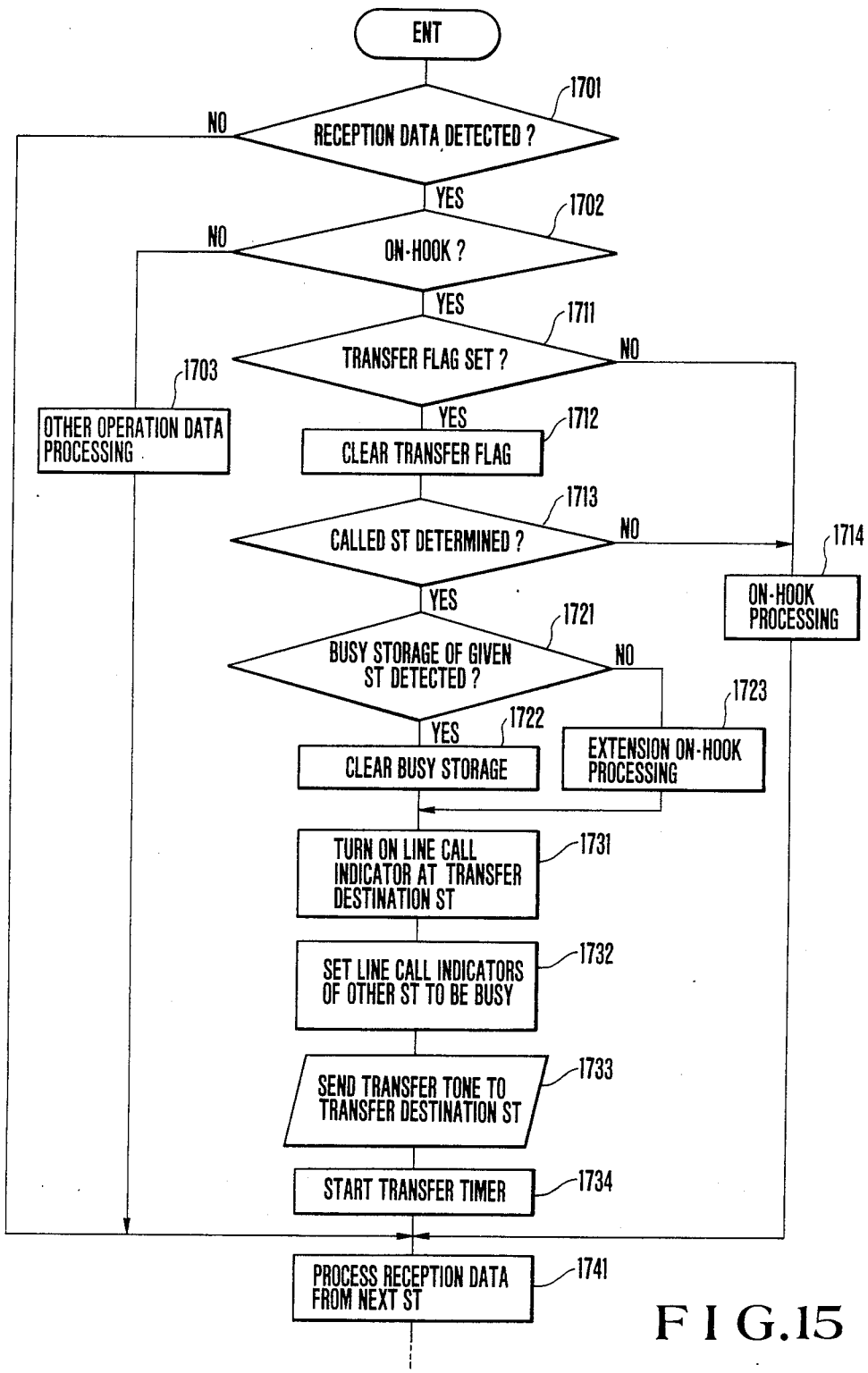

FIG. 15 shows the same operation as in FIG. 14 when one of the key telephone sets is held in the on-hook state after the operations in FIG. 8. Referring to FIG. 15, if YES in step 1701, the CPUm 21 determines in step 1702 whether the on-hook state is set. If NO in step 1702, other operation data processing is performed in step 1703. However, if YES in step 1702, the CPUm 21 determines in step 1711 whether the transfer flag set in step 1513 in FIG. 14 is still set. If YES in step 1711, the transfer flag is cleared in step 1712. The CPUm 21 determines in step 1713 whether the content of the RAM 25 determined in step 624 is kept unchanged. If NO in step 1711 or 1713, on-hook processing is performed in step 1714 to cancel the switching connection.

If YES in step 1713, the same decision block as in step 611 is checked in step 1721. If YES in step 1721, the busy status data is cleared in step 1722. Therefore, the data in the RAM 25 is cleared. However, if NO in step 1721, on-hook processing is performed in step 1721 to cancel the switching connection.

The called key telephone set determined in step 1713 is defined as the transfer destination key telephone set. The corresponding indicator at the transfer destination is turned on in step 1731. The corresponding line indicator for the other key telephone set is turned on in step 1732. A transfer tone is sent to the transfer destination in step 1733. The transfer timer in the CPUm 21 is started in step 1734. Processing for reception data from the next key telephone set is performed in step 1741.

When the on-hook operation is performed at the transfer source key telephone set, the indicator at the transfer destination flickers and a tone signal is produced at the loudspeaker 32, thereby indicating the transfer state. Therefore, the line indicator showing the holding state is changed to the transfer indication state. The corresponding line indicators in other key telephone sets indicate a busy state.

Figure 16:
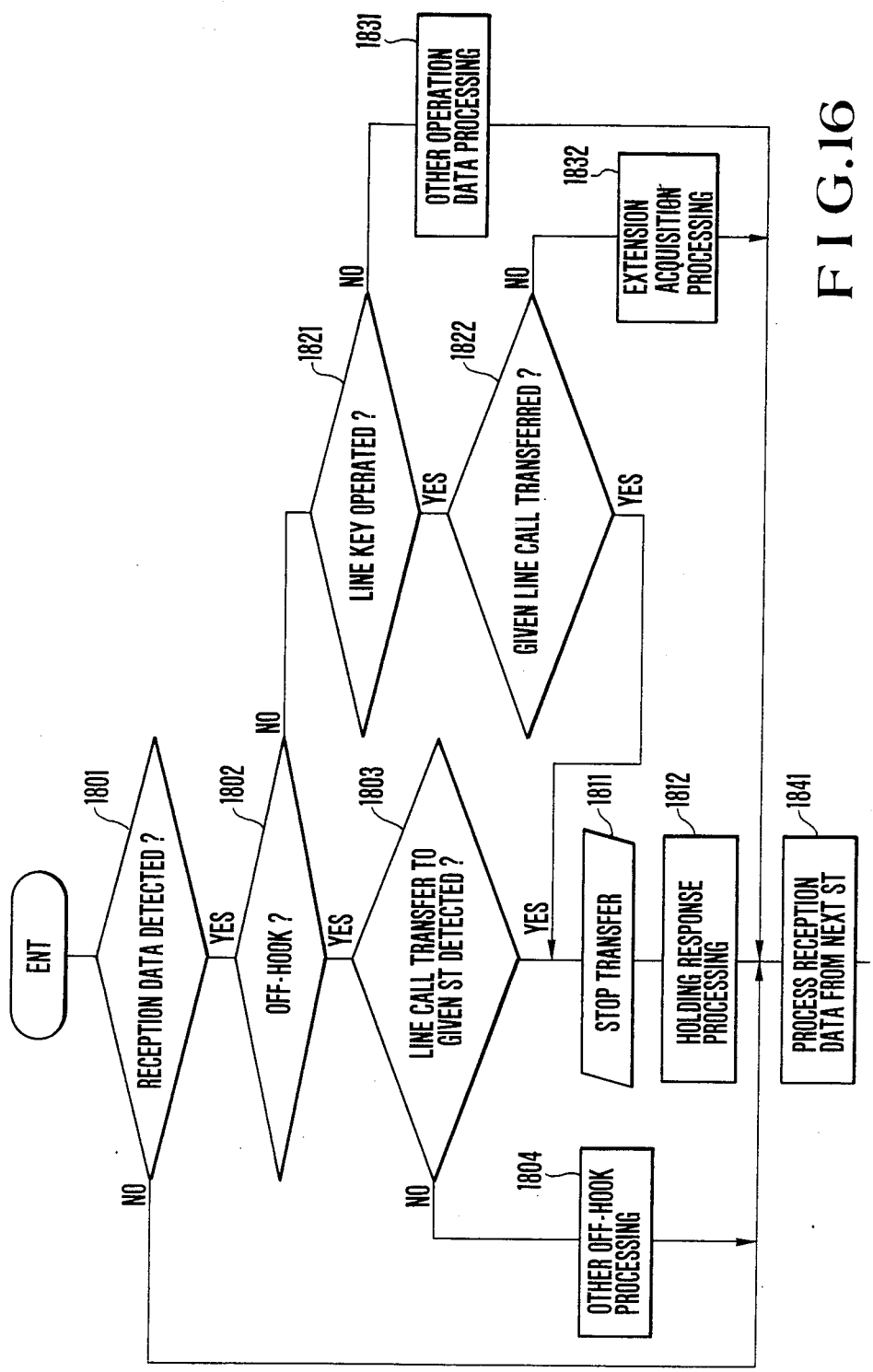

FIG. 16 shows the same operation as in FIG. 7 when the conditions in FIG. 15 are satisfied and the transfer destination key telephone set is held in the off-hook state. The CPUm 21 first determines in step 1801 whether data is received. If YES in step in 1801, the CPUm 21 determines in step 1802 whether the off-hook state is held. If YES in step 1802, the CPUm 21 determines in step 1803 according to the operations in steps 1731 and 1732 whether a line call transfer to the key telephone set of interest is made. If NO in step 1803, other off-hook processing is performed in step 1804. However, if YES in step 1803, the transfer tone generated in step 1733 is stopped in step 1811. At the same time, holding processing is performed in step 1812 to connect the destination key telephone set to the held lines, and the line indicator is changed to the busy state in the same manner as in other key telephone sets.

If YES in step 1821 even if NO in step 1802, the CPUm 21 determines in step 1522 according to the status data from the RAM 25 whether a correct line transfer is made. If YES in step 1522, the flow advances to step 1811.

However, if NO in step 1821, other operation data processing is performed in step 1831. If NO in step 1822, line acquisition processing is performed in step 1832. Processing for reception data from the next key telephone set is performed in step 1841.

If the transfer destination key telephone set responds to the off-hook operation or the line key operation, the held lines can be automatically connected so that a transfer is completed.

Figure 17:
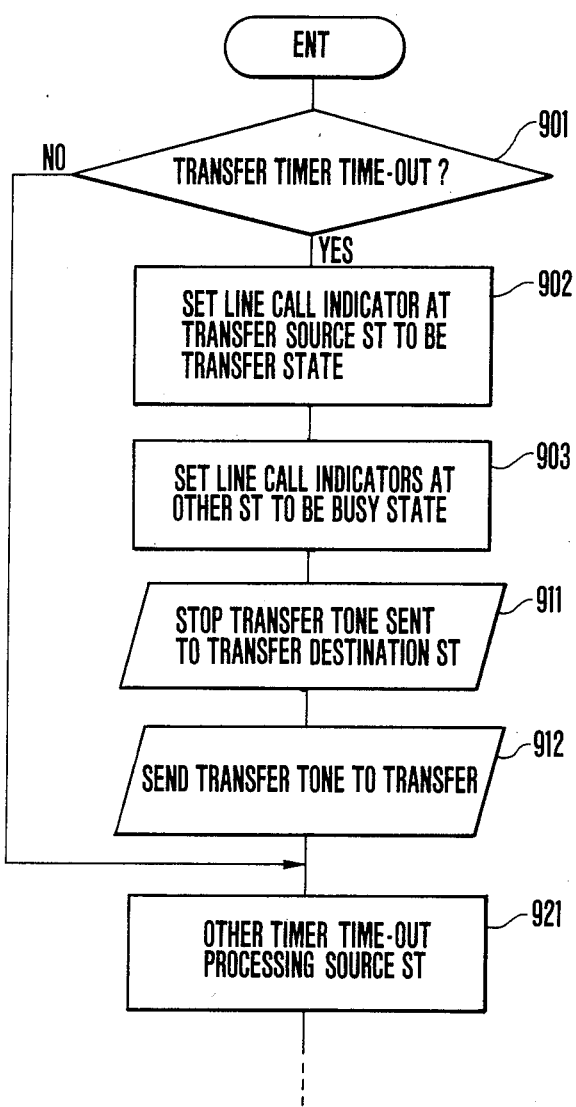

FIG. 17 shows detailed time-out processing in step 121 in FIG. 3. The CPUm 21 determines in step 1901 whether the timer time set in step 1734 has elapsed. If YES in step 1901 after the lapse of a predetermined period of time, control data is sent to the transfer source key telephone set which has performed an extension call. The corresponding line indicator at the source key telephone set indicates the transfer state in step 1902. Control data is sent to other key telephone sets including the destination one. The corresponding line indicators in these sets indicate the busy state in step 1903. Control data is then sent to the source and destination key telephone sets. The transfer tone at the destination key telephone set is stopped in step 1911. The transfer tone is sent to the source key telephone set in step 1921. Other time-out processing is then performed in step 1921.

If the transfer destination key telephone set does not respond even if a predetermined period of time has elapsed after the transfer source key telephone set performs the extension call and the on-hook operation, transfer display is performed at the transfer source key telephone set. The operator at the transfer source can visually check absence of a response at the transfer destination. Therefore, the held lines can be acquired again to establish a call with the line calling party again.

Even if all extension links are busy, the transfer source key telephone set can make an extension call for a transfer destination and then can perform an off-hook operation. Therefore, a call transfer can be easily performed for a destination which is busy or incapable of accepting an extension call.

As is apparent from the modifications as described above with reference to FIGS. 14 to 17, at the transfer destination key telephone set, the transfer state can be set and the transfer source key telephone set does not wait until an idle extension link is generated while all extension links are busy. Therefore, the line call transfer procedure can be simplified. Practical advantages can be obtained in various key telephone systems.

The present invention is not limited to the particular embodiment described above. Various changes and modifications may be made within the spirit and scope of the invention.

In the extension call mode, under the conditions that all extension links are busy and the extension wait state is set, if an idle extension link is detected, the called key telephone set is called only if it is in the on-hook state. However, the called key telephone set may be called regardless of its hook state.

What is claimed is:

1. A key telephone system including a plurality of key telephone sets selectively connected to a plurality of telephone lines, said plurality of key telephone sets being adapted to communicate with each other through a plurality of extension links, comprising:

a first memory for storing first data indicating availability of each of the extension links;

first discriminating means for interrogating said first data when a transfer source key telephone set attempts a line transfer to a transfer destination key telephone set to determine whether any of said extension links are available;

alarming means for signalling said transfer source key telephone set that all of said extension links are busy when said discriminating means determines that none of said extension links is available;

a second memory for storing second data identifying said transfer source and transfer destination key telephone sets when said alarming means signals that all of said extension links are busy;

first transfer indicating means associated with said transfer destination key telephone set for indicating, upon an on-hook operation of said transfer source key telephone set, that said line transfer is being attempted;

timer means for timing a predetermined time interval beginning when said transfer indicating means indicates that said line transfer is being attempted;

control means for interrupting said indication that said line transfer is being attempted when said transfer destination key telephone set is not in an off-hook condition within said predetermined time interval; and second transfer indicating means associated with said transfer source key telephone set for indicating that said transfer destination key telephone set was not in an off-hook condition within said predetermined time interval;

whereby a telephone line connected to said transfer source key telephone set is transferred to said transfer destination key telephone set upon an off-hook operation of said transfer destination key telephone set after one of said extension links is available and said transfer source key telephone set is placed in an on-hook condition.

* * * * *